(12) United States Patent
Budde et al.

(10) Patent No.: US 7,216,860 B2
(45) Date of Patent: May 15, 2007

(54) BEARING SEAT OF A TENSION STRUT MADE OF COMPOSITE MATERIALS

(75) Inventors: Frank Budde, Damme (DE); Stefan Schönhoff, Osnabrück (DE); Jochen Kruse, Osnabrück (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 10/466,137

(22) PCT Filed: Nov. 7, 2002

(86) PCT No.: PCT/DE02/04141

§ 371 (c)(1),
(2), (4) Date: Jul. 10, 2003

(87) PCT Pub. No.: WO03/039893

PCT Pub. Date: May 15, 2003

(65) Prior Publication Data

US 2004/0045762 A1    Mar. 11, 2004

(30) Foreign Application Priority Data

Nov. 7, 2001  (DE) ................................ 101 54 210

(51) Int. Cl.
*B60G 3/02* (2006.01)

(52) U.S. Cl. .................................. 267/188; 280/124.134

(58) Field of Classification Search ................ 267/188, 267/189, 140.12, 141.1, 141.7, 273, 276, 267/279, 280, 281; 280/683, 685, 124.134, 280/124.153

See application file for complete search history.

(56) References Cited

U.S. PATENT DOCUMENTS

| 3,362,252 | A | * | 1/1968 | Ditlinger | 74/579 R |
|---|---|---|---|---|---|
| 3,701,373 | A | * | 10/1972 | Wronke et al. | 411/182 |
| 4,157,227 | A | * | 6/1979 | Hahle | 403/228 |
| 4,659,069 | A | * | 4/1987 | Odobasic | 267/280 |
| 4,718,780 | A | * | 1/1988 | Trudeau | 384/206 |
| 4,880,343 | A | * | 11/1989 | Matsumoto | 411/222 |
| 5,273,261 | A | * | 12/1993 | Hamberg et al. | 267/140.12 |
| 5,338,011 | A | * | 8/1994 | Hein | 267/140.12 |
| 5,374,038 | A | * | 12/1994 | Hein | 267/140.5 |
| 5,788,264 | A | * | 8/1998 | Adkins et al. | 280/124.106 |
| 6,324,940 | B1 | * | 12/2001 | Pazdirek et al. | 74/579 R |
| 6,409,062 | B1 | * | 6/2002 | Lundgren et al. | 224/309 |
| 6,622,975 | B2 | * | 9/2003 | Steinmaier | 248/60 |
| 6,863,289 | B2 | * | 3/2005 | Buhl et al. | 280/124.111 |
| 2004/0070129 | A1 | * | 4/2004 | Budde et al. | 267/188 |
| 2004/0131418 | A1 | * | 7/2004 | Budde et al. | 403/278 |

FOREIGN PATENT DOCUMENTS

DE        688 758 C        3/1940

(Continued)

*Primary Examiner*—Christopher P. Schwartz
(74) *Attorney, Agent, or Firm*—McGlew & Tuttle, P.C.

(57) ABSTRACT

A mount support of a force connection strut is provided manufactured from plastic/metal composite materials for a chassis of a motor vehicle. The force connection strut has an elongated basic body and a sleeve (H) passing through the basic body. The sleeve (H) has a flange (F) on at least one side and is connected to the basic body by extrusion coating with plastic at least at one of its ends.

28 Claims, 4 Drawing Sheets

FOREIGN PATENT DOCUMENTS

| | | | |
|---|---|---|---|
| DE | 30 04 194 A1 | | 8/1981 |
| DE | 3412578 | * | 8/1985 |
| DE | 86 16 013 U1 | | 6/1987 |
| DE | 41 39 582 C2 | | 11/1992 |
| DE | 93 06 266 U1 | | 11/1994 |
| DE | 196 31 893 A1 | | 2/1998 |
| DE | 197 42 955 A1 | | 4/1999 |
| DE | 19814792 | * | 7/1999 |
| DE | 199 31 079 A1 | | 2/2000 |
| DE | 198 54 084 A1 | | 7/2000 |
| DE | 201 05 490 U1 | | 1/2002 |
| EP | 0 622 254 A1 | | 11/1994 |
| EP | 0849491 | * | 6/1998 |
| EP | 0851131 | * | 7/1998 |
| EP | 1 174 293 A1 | | 1/2002 |
| FR | 2765503 | * | 1/1999 |
| JP | 11-241745 | * | 9/1999 |

* cited by examiner

BEARING SEAT OF A TENSION STRUT MADE OF COMPOSITE MATERIALS

CROSS REFERENCE TO RELATED APPLICATIONS

This application is a United States National Phase application of International Application PCT/DE 02/04141 and claims the benefit of priority under 35 U.S.C. § 119 of German Application DE 101 54 210.0 filed Nov. 7, 2001. This application is related to copending application Ser. No. 10/466,967.

BACKGROUND OF THE INVENTION

A similar mount support of a chassis part is known from DE 199 31 079 A1. This German unexamined patent application discloses a chassis part with a narrow spring characteristic, and this chassis part, which may be, e.g., an axle guide, has an elongated basic structure in the form of a strut, and openings are provided at the ends of the strut, and an outer sleeve, in which a pad made of an elastomer material, with another inner bush is in turn arranged, is located in the said openings. In a special embodiment, the sleeve has a crowned expansion in its middle. The fastening of the sleeve in the basic body is not described more specifically, but it seems to be achieved by pressing the sleeve together with the basic body.

One problem in such pressed-in sleeves may be that the sleeve may separate from the basic body during the operation due to the axial forces that occur.

SUMMARY OF THE INVENTION

The object of the present invention is to find another simple form of a mount support for a force connection strut of a chassis, which guarantees the secure seating of the sleeve in the basic body.

According to the invention, a mount support of a force connection strut is provided manufactured from composite materials in a chassis of a motor vehicle. The force connection strut has an elongated basic body and a sleeve passing through the basic body. The sleeve has a flange at least on one side, and is connected to the basic body by extrusion coating with a plastic at least at one of its ends.

Accordingly, the inventors propose that the mount support, which is known per se, on a force connection strut of a chassis of a passenger car or utility vehicle be improved, wherein the force connection strut has an elongated basic body and a sleeve passing through this basic body. The improvement involves the sleeve having a flange at least on one side and is connected to the basic body by extrusion-coating with plastic at least at one of its ends. The extrusion coating of the sleeve or the flange may be carried out according to the present invention completely or only in the radial area of the flange. Highly secure connection is created between the basic body and the sleeve by this manner of design of the sleeve and the extrusion coating with plastic, so that separation of the sleeve from the basic body can be prevented from occurring even under the action of stronger forces.

Provisions are made in an advantageous variant of the present invention for the basic body to have a metal insert at least in the area of the mount support, which said metal insert is likewise passed through by the sleeve. As a result, an additional stability of the connection between the mount support and the basic body is achieved.

In addition, the inventors propose that the sleeve be in direct non-positive contact with the metal insert of the basic body in at least one plane. As a result, the sleeve can be additionally supported directly at the metal insert of the basic body, so that an improvement is achieved in the stability of the connection between the basic body and the sleeve.

Corresponding to the idea of the invention, the sleeve may consist of, e.g., metal, preferably steel or aluminum or a metal alloy. However, it is also possible to manufacture the sleeve from plastic in the case of a mount support that is subject to a somewhat lower load.

If the mount support is loaded axially in both directions rather than in one direction, it may be advantageous for the sleeve to have a flange each at both ends, so that supporting is possible in both axial directions of the sleeve via the flange in relation to the basic body or the metal insert. This can be achieved, e.g., by inserting a sleeve with only a single flange into the opening of a metal insert and by subsequently preparing the second flange, e.g., by ultrasound welding in the case of a plastic sleeve or by a corresponding cold forming of a metallic sleeve. The plastic structure can be subsequently coated by extrusion around the metal insert including the sleeve disposed therein.

If the basic body at which the mount support is located has a correspondingly shaped metal insert or two metal inserts arranged correspondingly in the area of the mount support, it is possible to prepare two openings located opposite each other in the metal insert, so that the sleeve passes through both openings of one metal insert or of both metal inserts.

A further improvement of the mount support can be achieved by the plastic used, with which the sleeve is extrusion coated, being provided at least partially with fiber reinforcements, for which purpose it is possible to use, e.g., glass fibers, carbon fibers or aramide fibers. If the percentage of fibers in the fiber reinforcement is selected now such that the thermal expansion characteristic of the plastic structures corresponds at least extensively to the thermal expansion characteristic of the sleeve at least in the range of the operating temperatures, it is also possible to avoid damages that could be caused by frequent temperature changes and differences in the thermal expansion characteristics of the materials.

A further improvement of the integration of the sleeve of the mount support in the basic body can be achieved by also extrusion coating at least one flange of the sleeve on the axial top side and/or underside with plastic. As a result, an additional corrosion protection is additionally achieved for the sleeve, especially if it consists of a metal.

It is also advantageous concerning the service life of the mount support for the sleeve, especially if it consists of a metal, to have a corrosion-inhibiting surface protection.

To improve the stability and to facilitate the positive-locking connection with the surrounding plastic, it may, moreover, be advantageous to provide the sleeve with beads. Furthermore, the positive-locking connection may also be improved by the sleeve having openings, e.g., in the area of the flange.

Furthermore, the inventors propose that the opening in the metal insert, into which the sleeve is inserted, have a rotationally asymmetric shape and that the sleeve have an outer shape fitting same, so that rotation of the sleeve in relation to the metal insert is prevented from occurring.

In addition, the inventors propose, especially with respect to the possibility of inserting a molecular bearing in the sleeve, that the sleeve have a radial contraction on its inner side.

Besides, it is proposed in a special embodiment of the mount support that the metal insert within the basic body be shaped such that it loops around the sleeve in the form of a loop.

Furthermore, the plastic structure, in which the sleeve is embedded, may also surround the metal insert of the force connection strut without a transition and thus define the outer shape of the force connection strut.

Furthermore, the metal insert may be advantageously shaped such that it is designed to receive a molecular bearing or a ball bearing or a fixed bearing.

It should also be noted that the sleeve according to the present invention may be not only an element of a cylindrical shape, but, e.g., also a cup, which has the form of a ball-and-socket joint housing.

The present invention will be described in greater detail below on the basis of the preferred exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
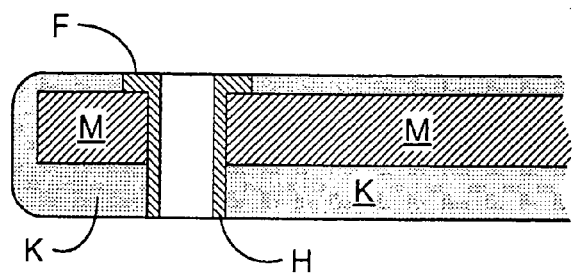
FIG. 1 is a sectional view showing a mount support with a sleeve embedded in plastic with a flange.

Referring to the drawings in particular, FIG. 1 shows a cross section through one end of the basic body of a force connection strut, which basic body is provided with a metal insert M. In the metal insert M there is an opening, through which a sleeve H was passed. On one side, the sleeve H has a flange F, which prevents the sleeve H from slipping through the metal insert. A plastic structure K, which defines the outer contour of the force connection strut and also forms at the same time a fastening for the sleeve in the area of the mount support, which is formed by the sleeve H, is extrusion-coated around the metal insert M and the sleeve H.

Figure 2:
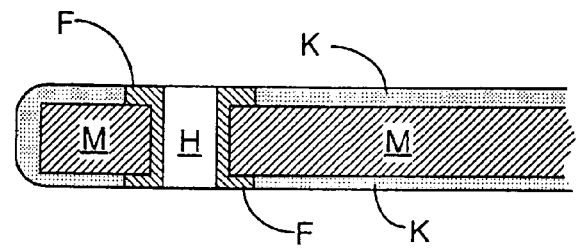
FIG. 2 is a sectional view showing a mount support with a sleeve embedded in plastic with flanges on both sides.

FIG. 2 shows a variant similar to that in FIG. 1, but the sleeve H of the mount support has two flanges F in this case, which are extrusion-coated with plastic K.

Figure 3:
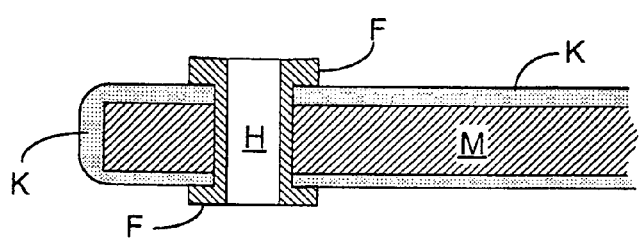
FIG. 3 is a sectional view showing a mount support with a sleeve with two flanges, embedded in plastic with the exception of the flanges.

Another variant of the mount support is shown in FIG. 3. One end of a force connection strut, which has a metal insert M, in which an opening is provided for the sleeve H, is likewise shown here. However, the distance between the two flanges F of the sleeve H is greater in this case than the thickness of the metal insert M, so that the flanges F are radially free from plastic K and only the cylindrical part of the sleeve H, which does not belong to the flanges, is surrounded by plastic K. The sleeve H of the mount support is thus seated on the plastic structure K of the force connection strut with the undersides of the two flanges F.

Figure 4:
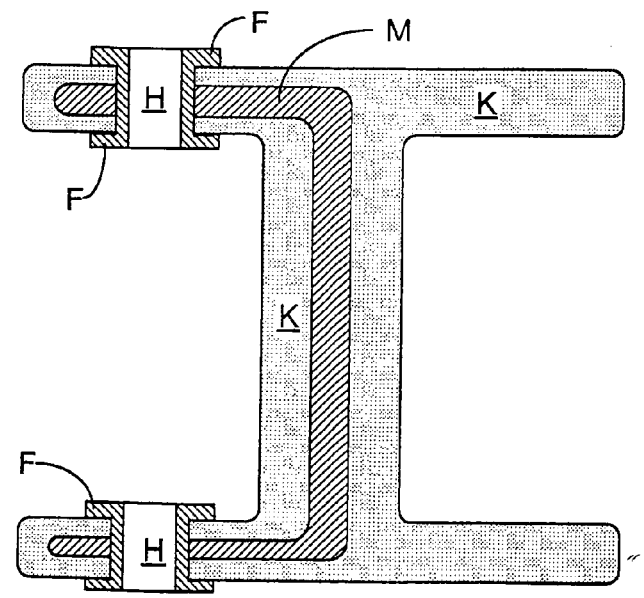
FIG. 4 is a sectional view showing a U-section embedded in an H-section made of plastic with mount supports.

Another variant of a mount support according to the present invention is shown in FIG. 4. This shows the cross section through an H-shaped plastic section with a U-shaped metal insert M. Openings are provided on the upper and lower left legs of the H section, and two sleeves H, whose embodiment corresponds to that in FIG. 3 and which are located axially opposite each other, are introduced through the openings. The upper and lower sleeves together form a single mount support in their cooperation.

Figure 5:
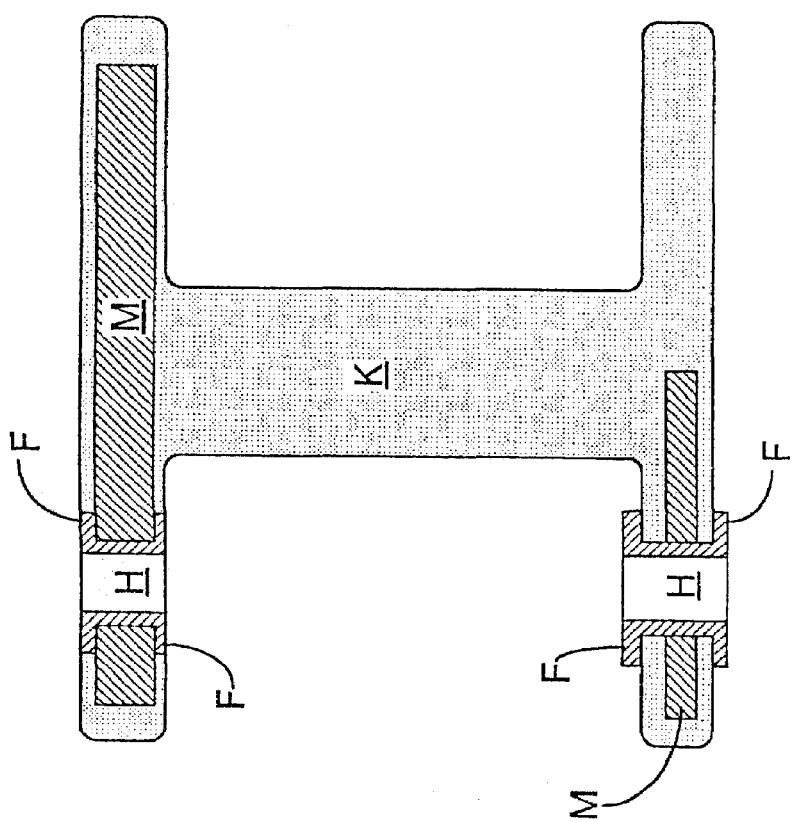
FIG. 5 is a sectional view showing a plastic H-section with two metal inserts and mount supports.

Another variant of the sleeves H located opposite each other, which form a mount support, is shown in FIG. 5. An H-shaped plastic structure K is likewise present here, but two metal inserts M, which are separated from each other, are arranged in it. A somewhat broader metal insert M extending over the entire upper leg can be seen at the top, while only one, smaller metal insert M, which extends over the left area, is shown in the lower leg. The embodiment of the upper sleeve H corresponds to that shown in FIG. 1 or 2, while the lower sleeve H, which is arranged axially in relation to the upper sleeve H, corresponds to the embodiment according to FIG. 3 or 4.

Figure 6:
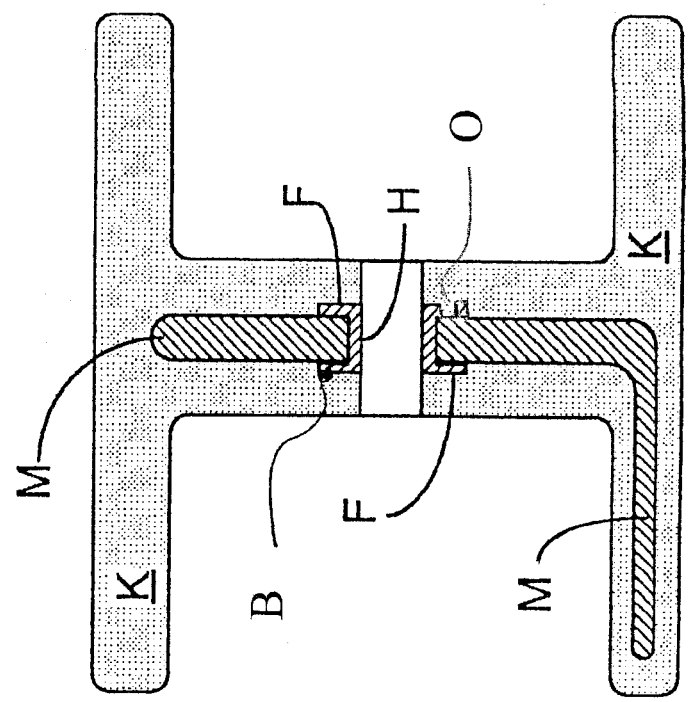
FIG. 6 is a sectional view showing a plastic U-section with a metal insert.

FIG. 6 shows a plastic U-section with an integrated metal insert M, wherein the two legs of the U-section are passed through a sleeve H each, and these sleeves form a single mount support in their cooperation.

Figure 8:
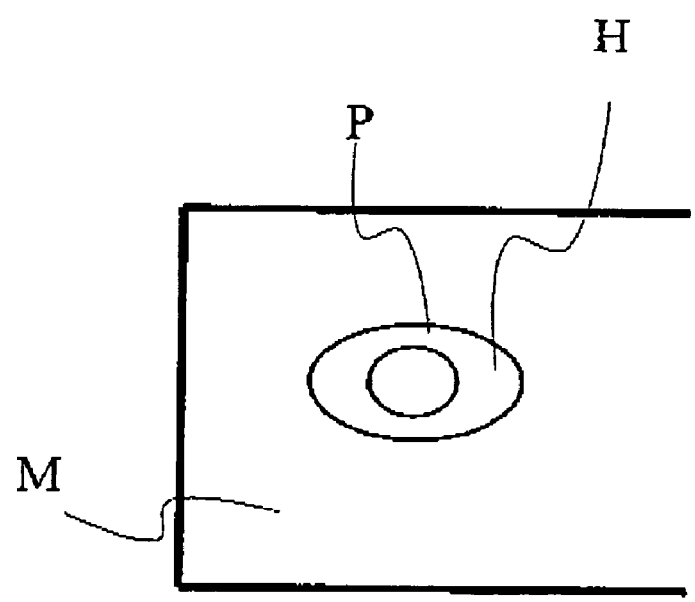
FIG. 8 is a plan view of the sleeve in the mount.

The sleeve, especially the flange, can have openings 0 or beads B to achieve a positive locking connection with the surrounding plastic and to improve stability. FIG. 8 shows the sleeve H mounted in an asymmetrical opening P of the metal insert M. The sleeve H has a complimentary asymmetrical shape so that the sleeve is prevented from rotating in relation to the metal insert.

Figure 7:
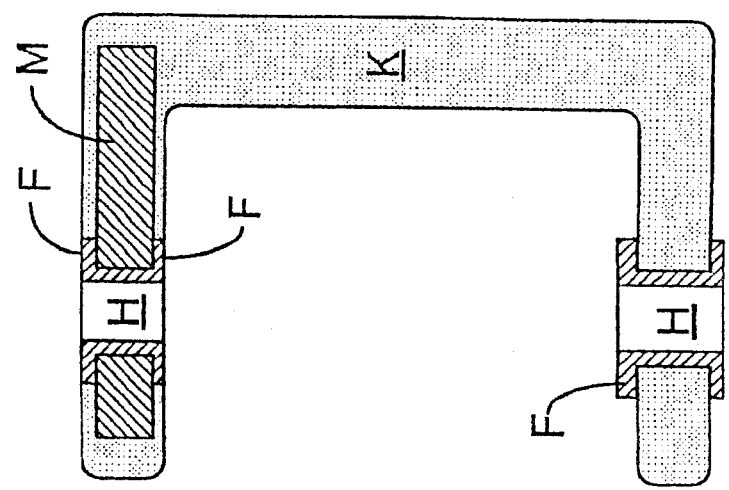
FIG. 7 is a sectional view showing a plastic H-section with an L-shaped metal insert with a mount support in the central leg.

Finally, FIG. 7 shows once again a plastic H-section with integrated L-shaped metal insert M. The mount support is disposed here in the vertical, central leg of the H-section, and the sleeve H inserted is completely surrounded by plastic K with the exception of the cylindrical inner part and passes through the metal insert M in this case as well.

On the whole, very good and firm seating of the sleeve H at or in the basic body of a force connection strut is consequently achieved with the mount support according to the present invention, and, in addition, the simple design makes possible a very rapid and inexpensive manufacture.

While specific embodiments of the invention have been shown and described in detail to illustrate the application of the principles of the invention, it will be understood that the invention may be embodied otherwise without departing from such principles.

The invention claimed is:

1. A force connection strut comprising:
   an elongated basic body;
   a separately formed sleeve passing through said basic body, said sleeve having a flange at least on one side extending in a radially outward direction from the central axis of said sleeve to form a radial outer shoulder; and
   a plastic extrusion coating, said sleeve being connected to said basic body by said plastic extrusion coating at least at one end of said sleeve, said sleeve extending through said plastic extrusion coating, said sleeve being in direct contact with said extrusion coating, said plastic extrusion coating radially surrounding said flange.

2. A force connection strut in accordance with claim 1, wherein said basic body comprises a metal insert, through which said sleeve passes, at least in the area of the mount support, said sleeve being in direct contact with said metal insert.

3. A force connection strut in accordance with claim 2, further comprising:
another sleeve passing through said basic body, said another sleeve having a flange at least on one side and being connected to said basic body by extrusion coating with a plastic at least at one of its ends.

4. A force connection strut in accordance with claim 3, wherein:
said another sleeve passes through said metal insert.

5. A force connection strut in accordance with claim 4, wherein:
said basic body is H-shaped and said metal insert is U-shaped.

6. A force connection strut in accordance with claim 4, wherein:
said sleeve and said another sleeve are in direct contact with said metal insert.

7. A force connection strut in accordance with claim 3, wherein:
said basic body has another metal insert;
said another sleeve passes through said another metal insert.

8. A force connection strut in accordance with claim 7, wherein:
said basic body is H-shaped.

9. A force connection strut in accordance with claim 3, wherein:
said another sleeve is in direct contact with said plastic formed by said extrusion coating.

10. A force connection strut according to claim 2, wherein said radial outer shoulder is in direct contact with said plastic and has a distance to said metal insert.

11. A force connection strut according to claim 10, wherein said sleeve has a second flange on the other side, extending in a radially outward direction from the central axis of said sleeve and forming a second radial outer shoulder, said second radial outer shoulder being in direct contact with said metal insert and the outer periphery of said second flange being in direct contact with said plastic, and said metal insert is arranged between both flanges.

12. A force connection strut with mount support according to claim 2, wherein said metal insert is a U-shaped structure having a first metal leg portion and a second metal leg portion, wherein said sleeve passes through said first metal leg portion, and a separately formed second sleeve passes through said second metal leg portion, said second sleeve having a second sleeve flange forming a second sleeve's radial outer shoulder at least on one side extending in a radially outward direction from the axis of said second sleeve, said sleeve and said second sleeve are located axially opposite each other and both sleeves form together a single mount structure.

13. A force connection strut with mount support according to claim 12, wherein said basic body is an H-shaped structure.

14. A force connection strut in accordance with claim 2, wherein said sleeve is in direct contact with said metal insert of said basic body in at least one plane.

15. A force connection strut in accordance with claim 2, wherein an opening of said metal insert has a rotationally asymmetric shape and said sleeve has an outer shape matching said opening, so that rotation of said sleeve in relation to said metal insert is prevented from occurring.

16. A force connection strut in accordance with claim 2, wherein said plastic embeds said sleeve and also surrounds said metal insert of said force connection strut without a transition.

17. A force connection strut in accordance with claim 2, wherein:
said basic body is H-shaped and said metal insert is L-shaped.

18. A force connection strut according to claim 2, wherein said radial outer shoulder is in direct contact with said metal insert and the outer periphery of said flange is in direct contact with said plastic.

19. A force connection strut in accordance with claim 1, wherein said plastic used has at least partially fiber reinforcement preferably from glass fibers, carbon fibers or aramide fibers.

20. A force connection strut in accordance with claim 19, wherein a percentage of fibers in said fiber reinforcements is selected to be such that the thermal expansion characteristic of plastic structures formed from said plastic in the range of the operating temperatures corresponds at least extensively to the thermal expansion characteristic of said sleeve.

21. A force connection strut according to claim 1, wherein a second flange forming a second radial outer shoulder extends from the opposite side of said sleeve in a radially outward direction from the central axis of said sleeve.

22. A force connection strut according to claim 21, wherein a second flange forming a second radial outer shoulder extends from the opposite side of said sleeve in a radially outward direction from the central axis of said sleeve, said second radial outer shoulder being in direct contact with said plastic and having a distance to said metal insert, said metal insert being arranged between said first and second flanges.

23. A force connection strut in accordance with claim 1, wherein an outer shape of the mount support is defined exclusively by said plastic.

24. A force connection strut in accordance with claim 1, wherein said flange of said sleeve is also extrusion-coated with plastic on an axial top side and/or underside.

25. A force connection strut in accordance with claim 1, wherein said sleeve has one of openings and beads to achieve positive-locking connection with surrounding said plastic and to improve the stability.

26. A strut comprising:
a metal basic body;
a first sleeve passing through said metal basic body, said sleeve having radial flanges with axial outer facing radial shoulder surfaces and axial inward shoulder surfaces, said metal basic body being arranged between said first sleeve radial flanges and in contact with adjacent axial inward shoulder surfaces;
a second sleeve spaced apart from said first sleeve such that an opening is defined between said first sleeve and said second sleeve, said second sleeve having second sleeve flanges with axial outer facing radial shoulder surfaces and axial inward shoulder surfaces, said second sleeve cooperating with said first sleeve to provide a single mounting structure;

a connection connecting said first and second sleeve to said basic body, said connection being formed by aplastic extrusion coating covering said metal basic body and covering said first sleeve axial outer facing radial shoulder surfaces and with said second sleeve axial inward shoulder surfaces in contact with said plastic coating.

27. A strut according to claim 26, further comprising:

a second metal body, said second sleeve passing through said basic body with an outer surface of said second sleeve being in contact with said second metal body and with said second sleeve axial inward shoulder surfaces spaced a distance from said second metal body and with said plastic therebetween.

28. A force connection strut comprising:

a metal elongated basic body;

a first sleeve passing through said metal basic body, said sleeve having radial flanges, said metal basic body being arranged between said first sleeve radial flanges;

a second sleeve passing through said metal basic body, said second sleeve having second sleeve flanges, said second sleeve being parallel to said first sleeve, said second sleeve cooperating with said first sleeve to provide a single mounting structure a plastic extrusion coating connecting said first and second sleeve to said basic body, said plastic extrusion coating radially covering said first and second sleeve flanges, said plastic extrusion coating covering said metal basic body.

* * * * *